Jan. 2, 1962 M. E. ANDERSON 3,015,533
MAGNETIC TRANSDUCER HEAD
Filed Dec. 11, 1957
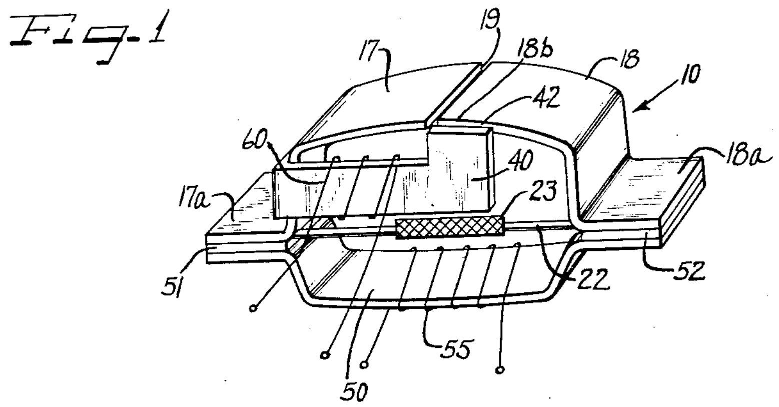
Fig-2
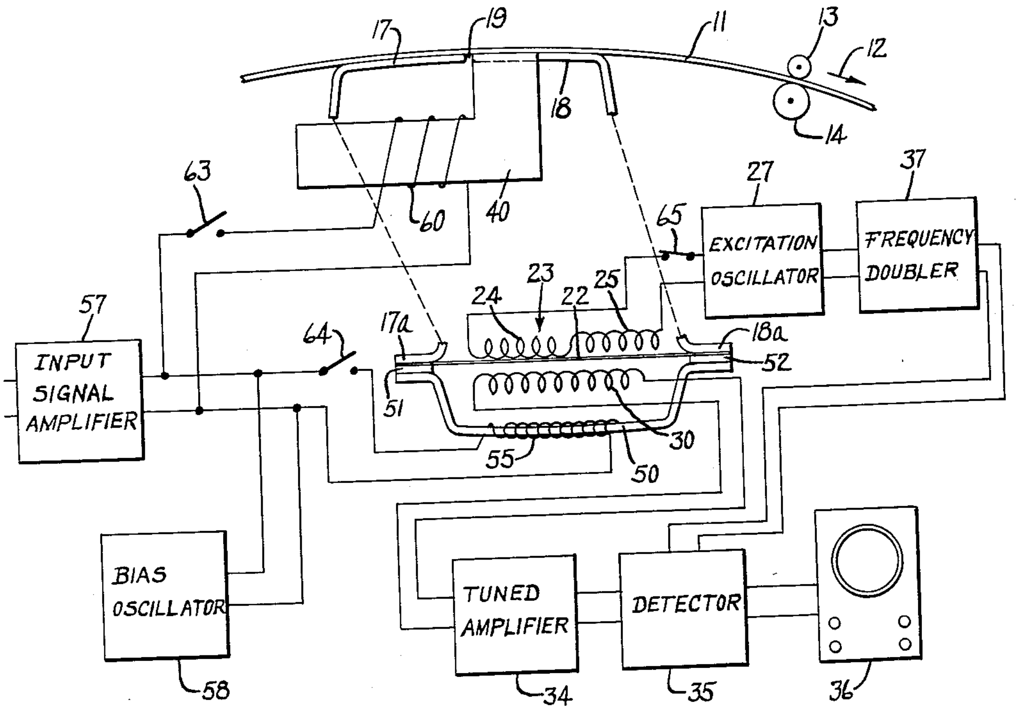
Inventor
Marvin E. Anderson
by Hill Sherman Meroni Gross & Simpson
Attys United States Patent Office
3,015,533
Patented Jan. 2, 1962

3,015,533
MAGNETIC TRANSDUCER HEAD

Marvin E. Anderson, Chicago, Ill., assignor to Armour Research Foundation of Illinois Institute of Technology, Chicago, Ill., a corporation of Illinois Filed Dec. 11, 1957, Ser. No. 702,098
18 Claims. (Cl. 346—74)

This invention relates to a magnetic transducer head and particularly to a combined magnetic recording and modulator playback head.

It is an object of the present invention to provide a novel magnetic transducer head capable of recording signals on magnetic record media and of responding directly to magnetic flux in playing back recorded signals.

Another object of the invention is to provide a unitary combined recording and magnetic modulator playback head.

A further object of the invention resides in the provision of a magnetic transducer head capable of responding to a wide range of wavelengths including "infinite wavelengths."

Other objects, features and advantages of the present invention will be apparent from the following detailed description taken in connection with the accompanying drawings, in which:

FIGURE 1 is a diagrammatic illustration of a combined recording and magnetic modulator playback head in accordance with the present invention; and FIGURE 2 is a diagrammatic illustration of an electric circuit for the head of FIGURE 1.

As shown on the drawings:

In FIGURE 1, there is illustrated a combined magnetic recording and modulator playback head 10, which is coupled to a record medium 11 as indicated in FIGURE 2. The record medium may be moved in the direction of the arrow 12 by suitable means such as indicated at 13 and 14. The head comprises a pair of pole pieces 17 and 18 defining a longitudinal gap 19 and further comprises a relatively thin saturating strip element 22 bridging between the lower ends **17*a* and 18*a* of the pole pieces 17 and 18. A winding assembly 23 encircles saturating strip 22 and comprises oppositely wound exciting winding portions 24 and 25 which are energized from a suitable excitation oscillator 27 to establish oppositely directed high frequency exciting fluxes in portions of the saturating strip 22. The winding assembly 23 also comprises an output winding 30 wound concentrically with portions 24 and 25 and connected with the input of an amplifier 34 tuned to the second harmonic of the frequency of oscillator 27. A detector 35 receives a second harmonic reference frequency from oscillator 27 through frequency doubler 37 and thus serves to demodulate the second harmonic output from amplifier 34. As is understood in the art, this provides an output which varies in polarity with the polarity of the signal flux introduced by the record medium. An output device such as indicated at 36 may be connected with the output of detector 35, the input of detector 35** being connected with the output of the amplifier.

In order to extend the range of response of the head to very long recorded wavelengths, a lateral pole piece 40 is provided which extends from the pole piece 17 into spaced relation to a lateral edge **18*b* of the pole piece 18 to define a transverse gap 42 therewith. This gap is so oriented as to respond to "infinite recorded wavelengths" on the record medium 11. It will be observed that signal flux coupled to the gap 42 will thread the saturating strip 22 in the same manner as flux produced at the longitudinal gap 19 so as to contribute to the output from the head. Gaps 19 and 42 together constitute a L-shaped gap which is responsive not only to relatively short wavelengths but also to relatively long recorded wavelengths. By way of example gap 19 can be made as small as in conventional playback head gaps, for example approximately .0003 inch, while gap 42** may be approximately .005 inch.

In order to enable the head to function efficiently as a recording head, a recording core member 50 is provided extending generally parallel to the saturating strip 22 but spaced therefrom by means of a pair of non-magnetic spacers 51 and 52 which may have a thickness, for example, of .005 inch. By this means, the record core member 50 has little shunting effect during playback. During recording, winding 55 on the recording member 50 is energized with the signal to be recorded, and the flux produced by winding 55 is of such intensity that the shunting flux path provided by the saturating strip 22 is saturated and no longer appears as a low reluctance flux path. Therefore, the only low reluctance path remaining includes the two gaps 19 and 42 which normally contact the recording medium 11 to produce adjacent longitudinal and transverse recorded traces on the record medium. The recording current fed to the recording winding 55 may consist of the amplified signal to be recorded from the recording amplifier 57 and a suitable high frequency bias current from bias oscillator 58 in the proper proportions as with conventional recording heads. An auxiliary recording winding 60 may be provided on the lateral pole member 40 if necessary to attain the proper flux level at gap 42; this depends on the difference in reluctance of the two gaps. Care must be taken in the proportionment of gap widths and recording flux levels at the two gaps to insure a flat response over the entire frequency range of the head. Gap 19 performs the same function as in a conventional record-playback head, recording the short wavelengths, and gap 42 is effective for only wavelengths greater than approximately half the head-to-tape contact length.

By the illustrated embodiment maximum possible wavelength response is obtained from infinite wavelengths to as small as can be sensed by longitudinal gap 19, while recording and playback are accomplished with a single structure.

Summarizing the operation of the head, during recording, switches 63 and 64 would be closed and switch 65 would be open. A suitable combination of the signal to be recorded and high frequency bias would be supplied to the recording winding 55 and also, if desired, to the auxiliary winding 60 to properly energize longitudinal gap 19 and transverse gap 42 to record the desired signal on the record medium 11. During recording, saturating strip 22 would be saturated and would provide a high reluctance path to recording flux from winding 55.

During playback, switches 63 and 64 would be open and switch 65 would be closed to supply a saturating exciting current from excitation oscillator 27 to oppositely wound windings 24 and 25 to establish opposed exciting fluxes in saturating strip 22. Signal flux introduced from the record medium 11 at gaps 19 and 42 would thread the saturating strip 22 to produce a corresponding change in the output from the detector 35 as sensed by the output device 36. Signal flux would not be unduly shunted from the saturating strip 22 by the recording core member 50 because of the non-magnetic spacers 51 and 52 isolating the recording member 50 from the remainder of the circuit during playback.

By way of example, saturable element 22 may have a cross section of .001 inch by .020 inch and be made of "Permalloy" while recording core member 50 may have a cross section of .020 inch by .125 inch and be made of "Mumetal." "Permalloy" may have a composition of 78.5% nickel and the remainder iron and impurities, while "Mumetal" may be 5% copper, 2% chromium, 77% nickel and the remainder iron and impurities.

It will be apparent that many modifications and variations may be effected without departing from the scope of the novel concepts of the present invention.

I claim as my invention:

1. A head assembly comprising a pair of pole pieces defining therebetween a non-magnetic gap, means comprising a saturable element defining a loop magnetic flux path with said pole pieces, excitation means coupled to said flux path for generating an exciting flux in said saturable element during playback operation of said assembly, means comprising a recording member defining a loop recording flux path including said pole pieces and the non-magnetic gap therebetween but excluding said saturable element, and means coupled directly to said recording member for establishing a recording flux at said gap during recording operation of said assembly.

2. A head assembly comprising a pair of pole pieces defining therebetween a non-magnetic gap for coupling to a magnetic record medium and having leg portions terminating in spaced relation, a thin saturable element engaging said leg portions and extending therebetween to define a playback flux path with said pole pieces, excitation means coupled to said playback flux path for generating an exciting flux in said saturable element during playback, a recording member of magnetic material having respective ends disposed in spaced relation to said leg portions with non-magnetic material interposed between said leg portions and said recording member to define a recording flux path with said pole pieces and said non-magnetic gap therebetween, and means coupled to said recording flux path for establishing a recording flux at said gap.

3. A head assembly comprising a pair of pole portions defining therebetween a non-magnetic gap, means comprising a saturable element defining a loop playback flux path with said pole portions, excitation means coupled to said playback flux path for generating an exciting flux in said saturable element during playback, a recording member having respective ends disposed in spaced relation to the respective ends of said saturable element to define a loop recording flux path with said pole portions, means coupled to said recording flux path for establishing a recording flux therein, and a third pole means connected to one of said pair of pole portions and terminating in spaced relation to a side edge of the other of said pair of pole portions to define a gap disposed transversely with respect to the gap between said pair of pole portions for energization by said recording flux establishing means.

4. A head assembly comprising a pair of pole portions defining therebetween a non-magnetic gap, means comprising a saturable element defining a loop playback flux path with said pole portions, means defining a recording flux path including said pair of pole portions and said non-magnetic gap therebetween but excluding said saturable element, and a recording winding extending in parallel to said saturable element and coupled to said recording flux path for establishing a recording flux at said gap.

5. A head assembly comprising a pair of pole pieces defining therebetween a non-magnetic gap and having leg portions terminating in spaced relation, a thin saturable element engaging said leg portions and extending therebetween to define a playback flux path including said pole pieces, excitation means coupled to said playback flux path for generating an exciting flux in said saturable element during playback, a recording member having respective ends disposed in spaced relation to said leg portions to define a recording flux path excluding said saturable element, third pole means connected in a recording flux path with said recording member and defining a transverse gap adjacent said first-mentioned gap, and winding means on said recording member for energizing said recording flux path to establish recording fluxes at said gaps.

6. A head assembly comprising a pair of pole pieces defining therebetween a non-magnetic gap and having leg portions terminating in spaced relation, a thin saturable element engaging said leg portions and extending therebetween to define a playback flux path including said pole pieces, excitation means coupled to said playback flux path for generating an exciting flux in said saturable element during playback, a recording member having respective ends disposed in spaced relation to said leg portions to define a recording flux path excluding said saturable element, third pole means connected in a recording flux path with said recording member and defining a transverse gap adjacent said first-mentioned gap, and winding means on said recording member for energizing said recording flux path to establish recording fluxes at said gaps, said third pole means having auxiliary winding means thereon for establishing a further recording flux at the gap defined by said third pole means.

7. A head assembly comprising means defining a playback flux path, means for coupling said playback flux path to a magnetic record medium, means defining a recording flux path including the same coupling means but excluding portions of said playback flux path, and recording means directly linking a portion of the recording flux path excluded from the playback flux path for generating a magnetomotive force in said portion of the recording flux path in accordance with a signal to be recorded on the magnetic record medium.

8. A head assembly comprising means defining a playback flux path, means for coupling said playback flux path to a magnetic record medium, means defining a recording flux path including the same coupling means but excluding portions of said playback flux path, and means tending to isolate the portion of said recording flux path which is not common to said playback flux path from said playback flux path to tend to exclude signal flux from the record medium from said portion of said recording flux path.

9. A head assembly comprising means defining a playback flux path, means for coupling said playback flux path to a magnetic record medium, means defining a recording flux path including said coupling means but excluding portions of said playback flux path, and means defining an auxiliary recording and playback flux path having means for coupling the auxiliary path to the record medium which is more efficient than said first mentioned coupling means at long recorded wavelengths.

10. A head assembly comprising a pair of pole portions defining therebetween a non-magnetic gap, means comprising a saturable element defining a loop playback flux path with said pole portions, excitation means coupled to said playback flux path for establishing an exciting flux in said saturable element during playback, and means defining an auxiliary gap which is more efficient than said first-mentioned gap for coupling to relatively long recorded wavelengths, and means defining a loop playback flux path including said auxiliary gap and said saturable element.

11. A head assembly comprising a pair of pole pieces defining therebetween a non-magnetic gap, means comprising a saturable element defining a loop magnetic flux path with said pole pieces, excitation means coupled to said flux path for generating an exciting flux in said saturable element during playback operation of said assembly, means comprising a recording core portion extending in parallel to said saturable element and defining a loop recording flux path including said pole pieces and the non-magnetic gap therebetween but excluding said saturable element, and means coupled to said recording flux path for establishing a recording flux at said gap during recording operation of said assembly, said recording core portion having an substantially greater flux carrying capacity than said saturable element.

12. A head assembly comprising a pair of pole pieces defining therebetween a non-magnetic gap, means comprising a saturable element defining a loop magnetic flux path with said pole pieces, excitation means coupled to said flux path for generating an exciting flux in said saturable element during playback operation of said assembly, means comprising a recording core portion extending in parallel to said saturable element and defining a loop recording flux path including said pole pieces and the non-magnetic gap therebetween but excluding said saturable element, and means coupled to said recording flux path for establishing a recording flux at said gap during recording operation of said assembly, said recording core portion having a substantially greater flux carrying capacity than said saturable element, and said recording flux establishing means comprising a recording winding on said magnetic core portion for applying a signal magnetomotive force to said recording core portion in accordance with a signal to be recorded.

13. A head assembly comprising means defining a playback flux path, means for coupling said playback flux path to a magnetic record medium, means defining a recording flux path including the same coupling means but excluding portions of the playback flux path, and means interposing a high reluctance between said playback flux path and the portion of the recording flux path excluded from the playback flux path to reduce the shunting effect of said portion of said recording flux path on said playback flux path during playback operation.

14. A head assembly comprising means defining a playback flux path, means for coupling said playback flux path to a magnetic record medium, and means defining a recording flux path including the same coupling means but including a magnetic core portion excluded from said playback flux path, and said magnetic core portion of said recording flux path having a substantially greater cross section of magnetic material than the portion of the playback flux path excluded from said recording flux path.

15. A head assembly comprising means defining a playback flux path, means for coupling said playback flux path to a magnetic record medium, means defining a recording flux path including said coupling means but excluding portions of said playback flux path, and means defining an auxiliary recording and playback flux path having means for coupling the auxiliary path to the record medium which is more efficient than said first mentioned coupling means at long recorded wave lengths, said couplings means for said playback and recording flux paths and said coupling means for said auxiliary path lying entirely at one side of the path of the magnetic record medium cooperating with said coupling means.

16. A head assembly comprising a pair of pole portions defining therebetween a non-magnetic gap, means comprising a saturable element defining a loop playback flux path with said pole portions, excitation means coupled to said playback flux path for establishing an exciting flux in said saturable element during playback, and means defining an auxiliary gap disposed laterally with respect to the direction of movement of a record medium thereacross which is more efficient than said first-mentioned gap for coupling to relatively long recorded wave lengths on the record medium, means defining a loop playback flux path including said auxiliary gap and said saturable element, and an auxiliary recording winding coupled directly to a portion of the loop playback flux path including said auxiliary gap but excluded from the loop playback path associated with said first-mentioned non-magnetic gap.

17. A head assembly comprising a pair of pole portions defining therebetween a non-magnetic gap, means defining a path for a magnetic record medium successively across said pole portions, third pole means defining a lateral gap disposed laterally with respect to the path of the record medium and adjacent said first-mentioned gap, means comprising a saturable element defining a loop magnetic circuit with said first mentioned pole portions and the non-magnetic gap therebetween, and means comprising an auxiliary magnetic core part excluded from said first-mentioned loop magnetic flux path and defining a second loop magnetic flux path with said third pole means defining said lateral gap, and said saturable element, and winding means directly on said auxiliary magnetic core part excluded from the first-mentioned loop magnetic circuit.

18. A head assembly comprising means defining a longitudinal gap and means defining a lateral gap both entirely on one side of the path of travel of a magnetic record medium, means connected in series with said longitudinal gap and with said lateral gap for generating an output responsive directly to signal flux introduced at said gaps and comprising a playback magnetic circuit, and means comprising a recording magnetic circuit portion entirely separate from said playback circuit for generating recording fluxes in said gaps, and means for interposing a high reluctance between said recording magnetic circuit portion and said playback magnetic circuit to reduce the shunting effect of said recording magnetic circuit portion during playback.

References Cited in the file of this patent

UNITED STATES PATENTS

| | | |
|---|---|---|
| 2,536,260 | Burns | Jan. 2, 1951 |
| 2,608,621 | Peterson | Aug. 26, 1952 |
| 2,658,114 | Buhrendorf | Nov. 3, 1953 |
| 2,722,569 | Loper | Nov. 1, 1955 |
| 2,768,243 | Hare | Oct. 23, 1956 |
| 2,803,708 | Camras | Aug. 20, 1957 |
| 2,855,464 | Wiegand | Oct. 7, 1958 |
| 2,889,414 | Gratian et al. | June 16, 1959 |
| 2,891,236 | Eisenberg | June 16, 1959 |